United States Patent
Stoila et al.

(10) Patent No.: US 7,185,534 B2
(45) Date of Patent: Mar. 6, 2007

(54) PLY WIRE SENSOR SYSTEM FOR A TIRE

(75) Inventors: George Michael Stoila, Tallmadge, OH (US); William Randall Dutt, Copley, OH (US); Shaun Matthew Immel, Massillon, OH (US); Eric Christian Osborn, Medina, OH (US); John Michael Maloney, Uniontown, OH (US); David Paul Schweitzer, North Canton, OH (US); Normajean Selby, Cuyahoga Falls, OH (US); Luis Antonio Cabrera Arevalo, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/196,083

(22) Filed: Aug. 3, 2005

(65) Prior Publication Data
US 2007/0028679 A1 Feb. 8, 2007

(51) Int. Cl.
G01M 17/02 (2006.01)
(52) U.S. Cl. ....................................................... 73/146
(58) Field of Classification Search ....... 73/146–146.8; 340/444–447
See application file for complete search history.

(56) References Cited

U.S. PATENT DOCUMENTS 5,218,861 A * 6/1993 Brown et al. ............... 73/146.5
6,624,748 B1 * 9/2003 Phelan et al. ............... 340/442
6,907,777 B2 * 6/2005 Weiss ........................... 73/146
6,914,523 B2 * 7/2005 Munch et al. ............... 340/447
6,921,197 B2 * 7/2005 Aubel et al. ................. 374/141
6,959,593 B2 * 11/2005 Mancosu et al. ............. 73/146
6,978,669 B2 * 12/2005 Lionetti et al. ............. 73/146.4

FOREIGN PATENT DOCUMENTS

| EP | 0 514 162 A2 | 11/1992 |
|---|---|---|
| JP | 52 078283 | 7/1977 |
| JP | 01 154735 | 6/1989 |
| JP | 07 253448 | 10/1995 |

OTHER PUBLICATIONS

European Search Report, completed Nov. 6, 2006.
Patent Abstracts of Japan, Publication No. 01154735, dated Jun. 16, 1989.
Patent Abstracts of Japan, Publication No. 07253448, dated Oct. 3, 1995.

* cited by examiner

*Primary Examiner*—Edward Lefkowitz
*Assistant Examiner*—Jermaine Jenkins
(74) *Attorney, Agent, or Firm*—Richard B. O'Planick

(57) ABSTRACT

A ply wire sensor system is provided for a tire carcass ply in a green tire carcass having a toroidal shape, the tire carcass ply having a plurality of spaced apart ply wires extending across the toroidal shape. The sensor system includes a wire sensor mounted in close proximity with the tire carcass ply, the wire sensor detecting the presence of a proximal ply wire; and means for establishing relative movement between the wire sensor and the tire carcass whereby the plurality of spaced apart ply wires are sequentially placed into proximity with the wire sensor. The wire sensor generates sequential data indicative of at least one ply wire parameter of the plurality of spaced apart ply wires.

20 Claims, 10 Drawing Sheets

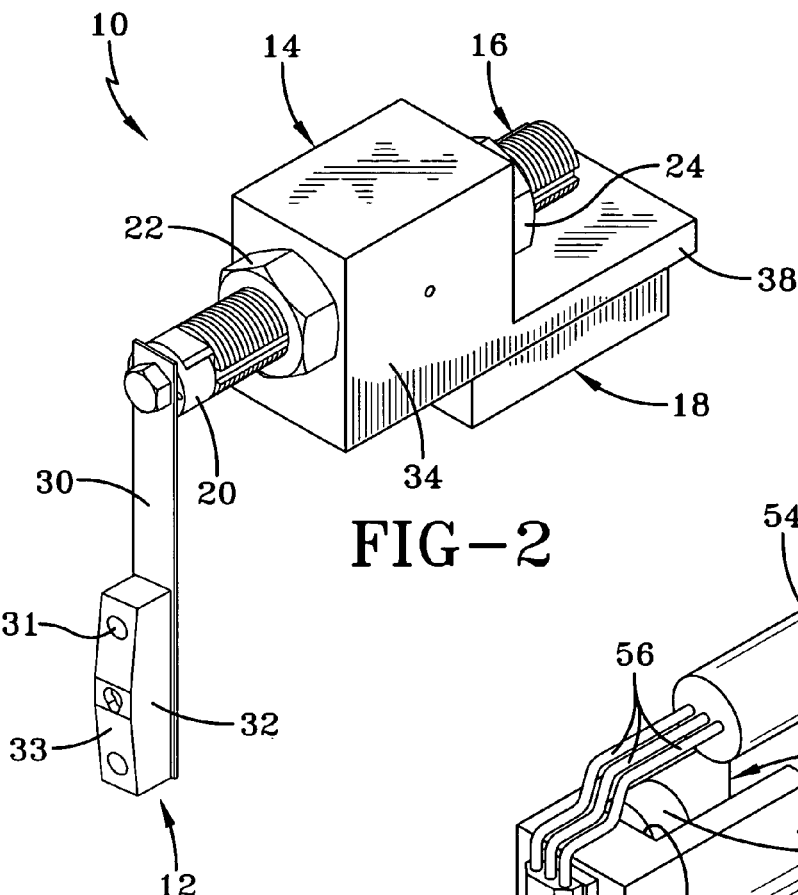
FIG-2
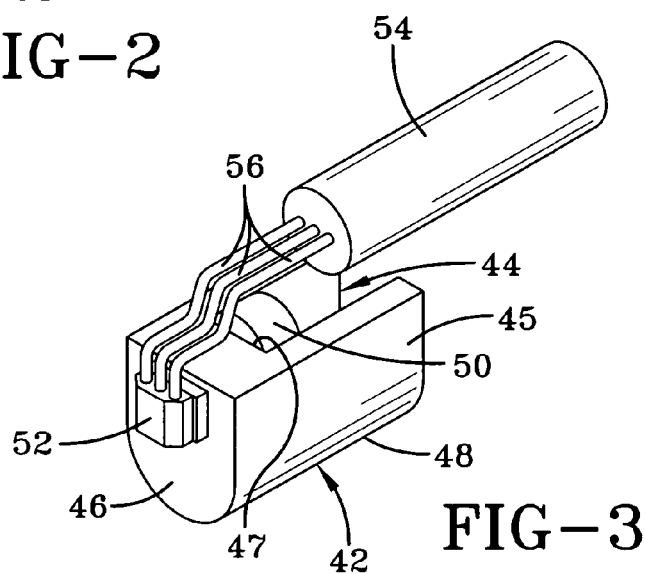
FIG-3
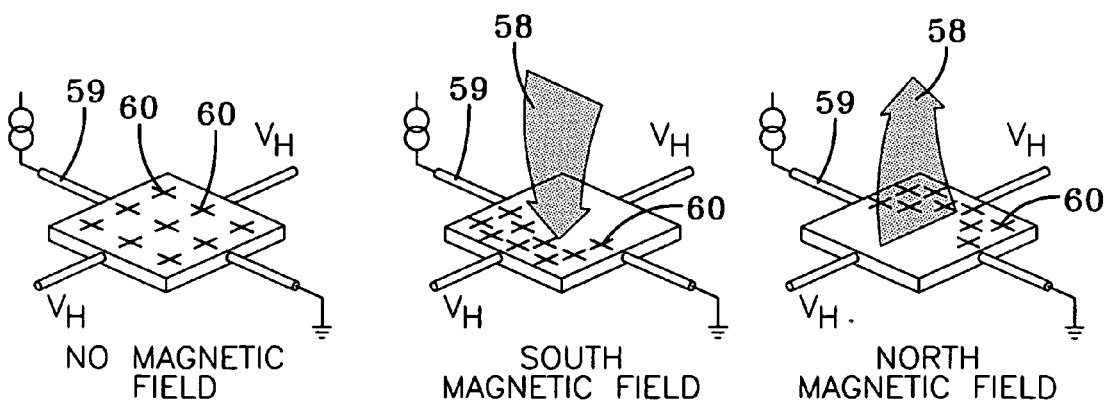
FIG-4A  NO MAGNETIC FIELD
FIG-4B  SOUTH MAGNETIC FIELD
FIG-4C  NORTH MAGNETIC FIELD

PLY WIRE SENSOR SYSTEM FOR A TIRE

FIELD OF THE INVENTION

The invention relates generally to a ply wire sensor system for a tire and, more specifically, to a green tire ply wire evaluation system for generating data indicative of certain ply wire parameters within a green toroidal tire carcass to ensure such parameters are within prescribed tolerances.

BACKGROUND OF THE INVENTION

Certain categories of tires are manufactured utilizing a steel cord body ply in which steel cords are embedded into a ply extending from tire bead to bead. In the manufacture of such tires, an initially flat steel cord body ply and other tire components are applied to a building drum at a band diameter to form a green tire. The green tire is subsequently diametrically expanded into a toroidal shape at a toroidal diameter prior to final curing and processing. In the process of changing the carcass from flat to toroidal shape, the cord spacing and cord ends per inch (epi) of wire cords changes. Should ply wire spacing anomalies occur, structural defects in the finished tire can result. Structural defects may be identified at final inspection of the finished tire, requiring the tire to be scrapped, resulting in costly waste. Structural defects in a tire that are not detected at a final inspection may cause tire failure later when the tire is put into use. For example, ply wire anomalies may result in sidewall bulge during the useful life of the tire if the spacing between ply wires is not carefully controlled during carcass expansion. In addition to ply wire spacing anomalies, the integrity and tightness of ply splice regions in the carcass and upstream component preparation of ply splices must be carefully maintained. Compromise of the splice regions as the tire carcass is converted from flat to toroidal shape should be avoided to eliminate structural defects in the finished tire. It is, therefore, important that the integrity of splice regions be maintained during toroidal expansion.

Thus, there is a need for a sensor system that can ascertain the disposition and condition of ply wires in a tire. Evaluating ply wire parameters preferably will occur relatively early in the tire manufacturing process so as to avoid scrapping the finished tire. Evaluating ply wire parameters, however, cannot be accurately conducted when the tire is in a pre-toroidal configuration because subsequent diametric expansion of the tire carcass may alter the condition and disposition of the ply wires and the integrity of splices within the tire carcass.

Commercial systems are available to scan blocks of ply wire as produced from steel cord calenders, or from specialized steel ply making systems. These commercial systems scan steel cords in the flat, unstretched, high epi condition. However, when tires are diametrically expanded on a building drum, typically on the order of 150% to 190% of flat build diameter, the epi count goes down and tire anomalies may appear. Since available systems function in a pre-expansion environment, they are ill suited to detect ply wire anomalies in a post-expansion tire carcass condition. Therefore, such commercially available systems represent a less than adequate solution to the needs of the industry.

A continuing need, accordingly, remains for a sensor assembly that can evaluate ply wire parameters such as ply wire count, and determine if wires are missing or spaced improperly in a post-expansion tire carcass stage. Such apparatus should be capable of functionally checking the integrity and tightness of ply splice regions and upstream component preparation ply splices and determining whether the rubber coat gauge on the steel ply wires is within tolerance limits.

SUMMARY OF THE INVENTION

The invention satisfies at least one of the industry needs in providing, according to one aspect, a ply wire sensor system is provided for a tire carcass ply in a green tire carcass having a toroidal shape, the tire carcass ply having a plurality of spaced apart ply wires extending across the toroidal shape. The sensor system includes a wire sensor mounted in close proximity with the tire carcass ply, the wire sensor detecting the presence of a proximal ply wire; and means for establishing relative movement between the wire sensor and the tire carcass whereby the plurality of spaced apart ply wires are sequentially placed into proximity with the wire sensor. The wire sensor generates sequential data indicative of at least one ply wire parameter of the plurality of spaced apart ply wires.

Pursuant to another aspect of the invention, the wire sensor may be mounted within a sensor housing disposed in contacting engagement with the tire carcass ply. The wire sensor may generate data indicative of one or more ply wire parameters taken from the group: [ply wire location; ply wire spacing; ply wire number; ply wire presence; ply wire condition]. The wire sensor may further be a Hall effect-based sensor pursuant to yet another aspect of the invention.

According to yet another aspect of the invention, the sensor system may include means for temporarily removing a carcass covering layer portion from a carcass ply portion whereby exposing the carcass ply portion to a sensor housing; and depressing means mounted adjacent to the sensor housing for sequentially depressing an external toroidal surface portion of the tire carcass adjacent the carcass covering layer portion.

Adjustment means may further be provided according to an aspect of the invention for controlling the extent of depression caused by the depressing means.

In a further aspect of the invention biasing means may be provided for biasing the sensor housing against the carcass ply.

The subject sensor system may further be included as part of a ply wire evaluation system wherein a toroidal green tire carcass body having an expanded toroidal diameter is evaluated so as to detect ply wire anomalies that may have resulted from diametric expansion of the green tire carcass from a flat build diameter to an expanded toroidal diameter.

DEFINITIONS

"Axial" and "axially" means the lines or directions that are parallel to the axis of rotation of the tire.

"Bead" or "Bead Core" means generally that part of the tire comprising an annular tensile member, the beads are associated with holding the tire to the rim being wrapped by or anchored to ply cords and shaped, with or without other reinforcement elements such as flippers, chippers, apexes or fillers, toe guards and chafers.

"Belt Structure" or Reinforcing Belts" means at least two annular layers or plies of parallel cords, woven or unwoven, underlying the tread, unanchored to the bead.

"Breakers or Breaker Reinforcement" is similar to a belt reinforcement, however, the cord layers are generally oriented at about the same angle as the underlying carcass plies; generally, these reinforcing layers are found in bias ply tires.

"Bias Ply Tire" means that the reinforcing cords in the carcass ply extend diagonally across the tire from bead-to-bead at about a 25–65.degree. angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Inner" means toward the inside of the tire and "outer" means toward its exterior.

"Innerliner" means the radially innermost air impervious layer used in making a tubeless tire.

"Lateral Edge" means the axially outermost edge of the belt as defined by a plane parallel to the centerplane and intersecting the outer ends of the axially outermost edges along the longitudinal direction.

"Leading End" refers to a cut end portion of part of the belt that is closest to the discharge end on the conveyor in the direction of conveyance.

"Radial" and "radially" means directions radially toward or away from the axis of rotation of the tire.

"Radial Ply Tire" means a belted or circumferentially restricted pneumatic tire in which the ply cords, which extend from bead to bead are laid at cord angles between 65. degree. and 90. degree with respect to the equatorial plane of the tire.

"Trailing End" refers to a cut end portion or part of the belt that is farthest from the discharge end of the conveyor in the direction of conveyance.

BRIEF DESCRIPTION OF THE DRAWINGS

The invention will be described by way of example and with reference to the accompanying drawings in which:

FIG. 2 is an assembled perspective view of a sensor assembly configured pursuant to the invention;

FIG. 3 is an assembled perspective view of a sensor subassembly configured pursuant to the invention;

FIGS. 4A, 4B, and 4C are diagrammatic views of the operation of a Hall effect-based sensor pursuant to the invention;

DETAILED DESCRIPTION OF THE INVENTION

Figure 1:
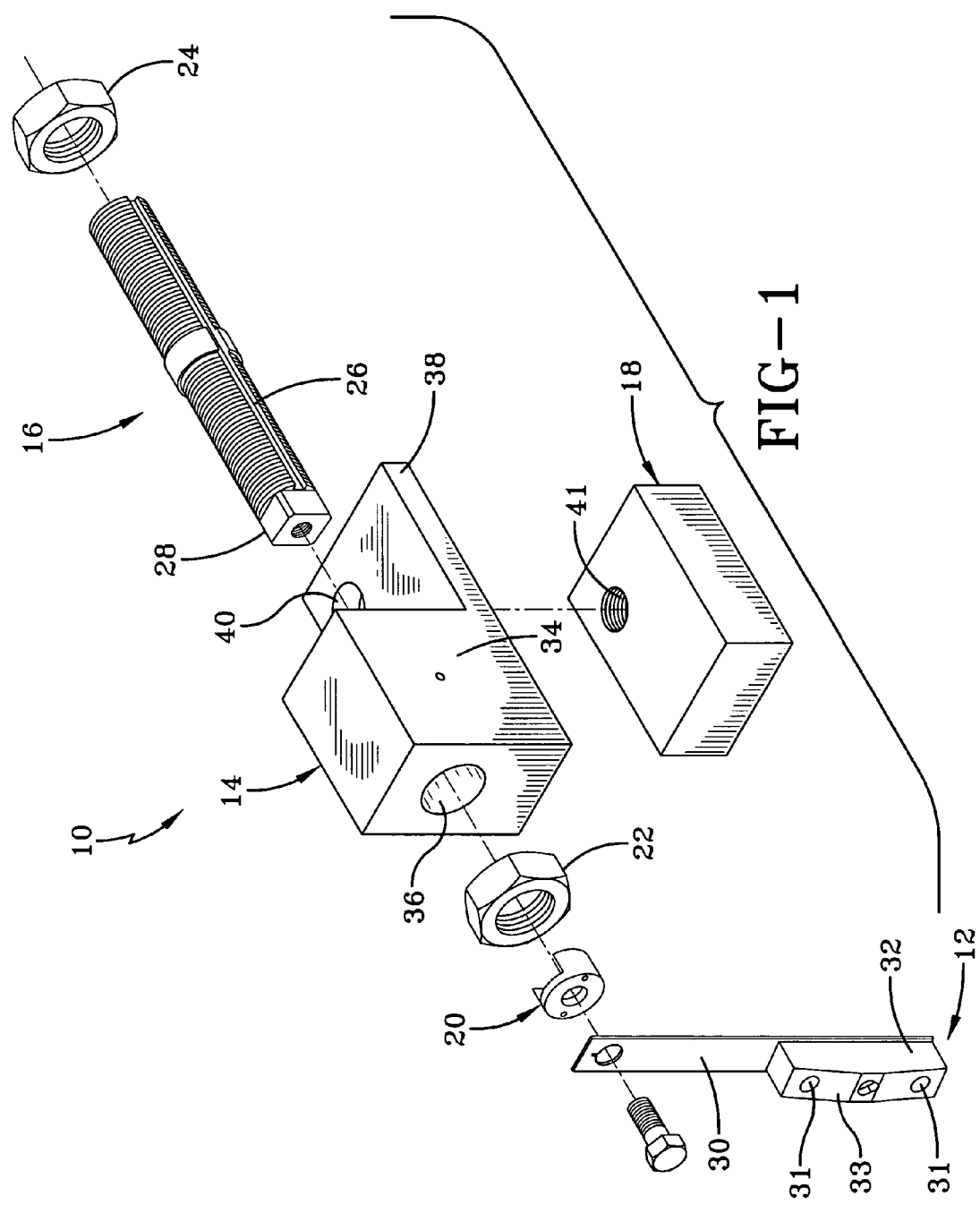
FIG. 1 is a an exploded perspective view of a sensor assembly configured pursuant to the invention.

With initial reference to FIGS. 1 and 2, a sensor apparatus 10 configured to the invention includes a sensor subassembly 12, a screw housing 14, adjustment screw 16, base block 18, locking flange washer 20, nut 22, screw 23, and nut 24, constructed from respective suitable materials by conventional means. The screw 16 has an elongate threaded body 26 terminating at a forward internally threaded socket 28. An elongate cantilevered leaf spring finger 30 is provided formed from sufficiently resilient spring material such as metal, and connects with fasteners 31 at a remote end with a wear shoe 32. Shoe 32 has a central cavity (not shown) and a lower concave surface 33. Shoe 32 is composed of a suitable relatively low friction material, such as but not limited to TEFLON, or other commercially available low friction materials for a purpose explained below.

The screw housing 14 has an upright housing portion 34, a through-bore 36 extending through portion 34, and a housing flange extension 38. Through-bore 36 is dimensioned to closely receive screw 16 therein. Aperture 40 extends through the flange extension 38 and aligns with a threaded through bore 41 in the base block 18. The sensor subassembly 10 may be varied in components and configuration if desired without departing from the invention.

With reference to FIG. 3, a generally U-shaped sensor spacer shoe 42 is dimensioned to be received within the wear shoe 32 (FIGS. 1 and 2) and includes a channel 44 opening to a rear wall 45 of the shoe 32. A forward wall 46 of the shoe 42 is axially spaced a distance from a forward end wall 47 of the channel 44. A concave lower surface 48 of the shoe 42 is disposed a predetermined distance from the channel 44. Situated within the channel 44 adjacent the forward end wall 47 is a permanent magnet 50. Magnet 50 is of a type commercially available such as, without limiting intent, a magnet sold as part no. NEO 403785N by Jobmaster Magnets, located in Baltimore, Md. The magnet 50 is retained in a fixed position against end wall 47 by registration of magnet 50 with internal protrusions (not shown) within channel 44.

A sensor 52 is fixedly mounted to the end wall 46 of the spacer shoe 42 such as by an adhesive. A power/network cable 54 contains leads 56 operatively connected to power the sensor 52 and to convey data from the sensor 52 to a remote processor as will be explained. The sensor 52 is preferably, but not necessarily, a Hall effect-based sensor of a type commercially available. For example, without intent to delimit the invention, a Hall effect sensor of suitable type is sold as part no. A 1321LUA by Allegro MicroSystems, Inc., located at Worcester, Mass. Alternatively, the sensor may be a magneto resistor type of device that detects the presence of a conductor by measuring resistance change in the presence of a magnetic field. Such devices are commercially available and in wide use. As will be appreciated by those skilled in the art, a Hall effect sensor operates by detecting a transverse, electric potential-gradient in a current-carrying conductor upon application of a magnetic field.

With reference to FIGS. 3, 4A, 4B, and 4C, the operation of a Hall effect sensor 52 (or any suitable alternative sensor device such as, but not limited to, a magnetic resistor type device) will be appreciated. The sensor 52 detects a transverse, electric potential-gradient VH in the current carrying conductor 59 upon application of a magnetic field. FIG. 4A illustrates the charge 60 disposition in the absence of a magnetic field. FIG. 4B illustrates the charge distribution in the presence of a south magnetic field in the direction of the arrow 58. FIG. 4C illustrates the charge distribution in the presence of an oppositely directed north magnetic field in the direction of arrow 58. The conductor 59, it will be appreciated, represents one of a plurality of ply wires in the context of the subject invention. By detecting the potential-gradient VH, the presence or absence of a ply wire may be concluded. Moreover, by closely locating sensor 52 relative to a tire ply. the location of each ply wire may be ascertained and evaluated. As explained below, by presenting the plurality of spaced wires in a tire ply into sequential proximity with the wire sensor, each ply wire may be identified, located, and its spacing relative to adjacent wires determined.

Figure 5:
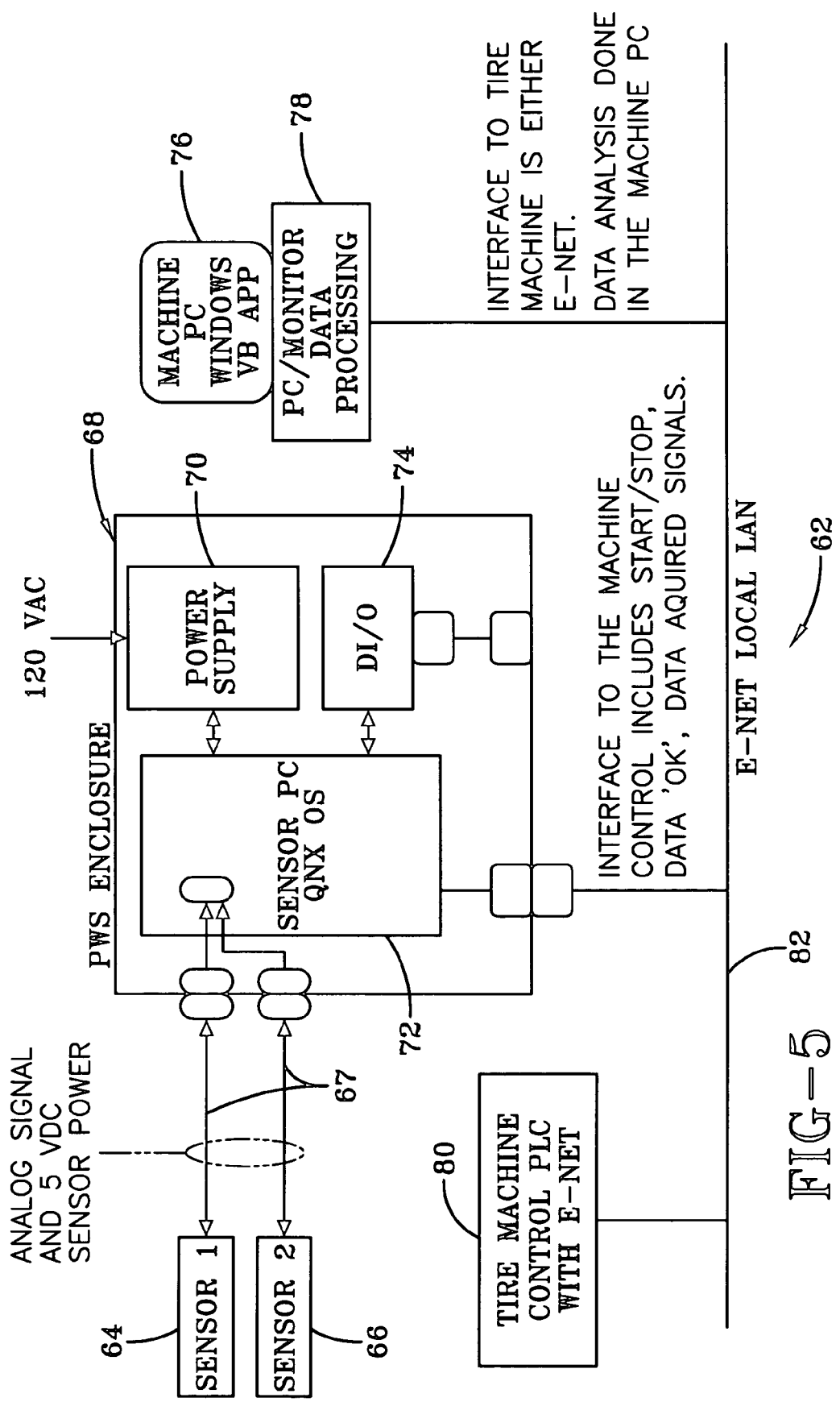
FIG. 5 is a block diagram of a ply wire sensor system configured pursuant to the invention.

A block level diagram of the sensor system 62 is depicted in FIG. 5 for a dual-sensor system configuration. A pair of sensor assemblies 64, 66 are disposed to sequentially detect the ply wires in a green tire ply and generate data indicative of ply wire parameters. Analog signal and 5 VDC sensor power 67 is supplied to each of the sensor assemblies 64, 66. Transmitted data from the sensor assemblies is input into a microprocessor (Sensor PC 72 QNX OS) for analysis. DI/O interface transmits programmable logic control signals to operating equipment including Start/Stop, Data "OK", and Data "Acquired" signals. Control signals for display purposes are likewise conveyed (76) providing appropriate PC/Monitor and Data Processing functions (78). The tire machine control is PLC based 80 with E-Net interface capability. It will be appreciated that communication between the tire machine and data processing unit 68 may be by E-Net Local LAN and that programmable logic control data may be conveyed to digitally control machine operation pursuant to conventional known methods to the art.

Figure 6:
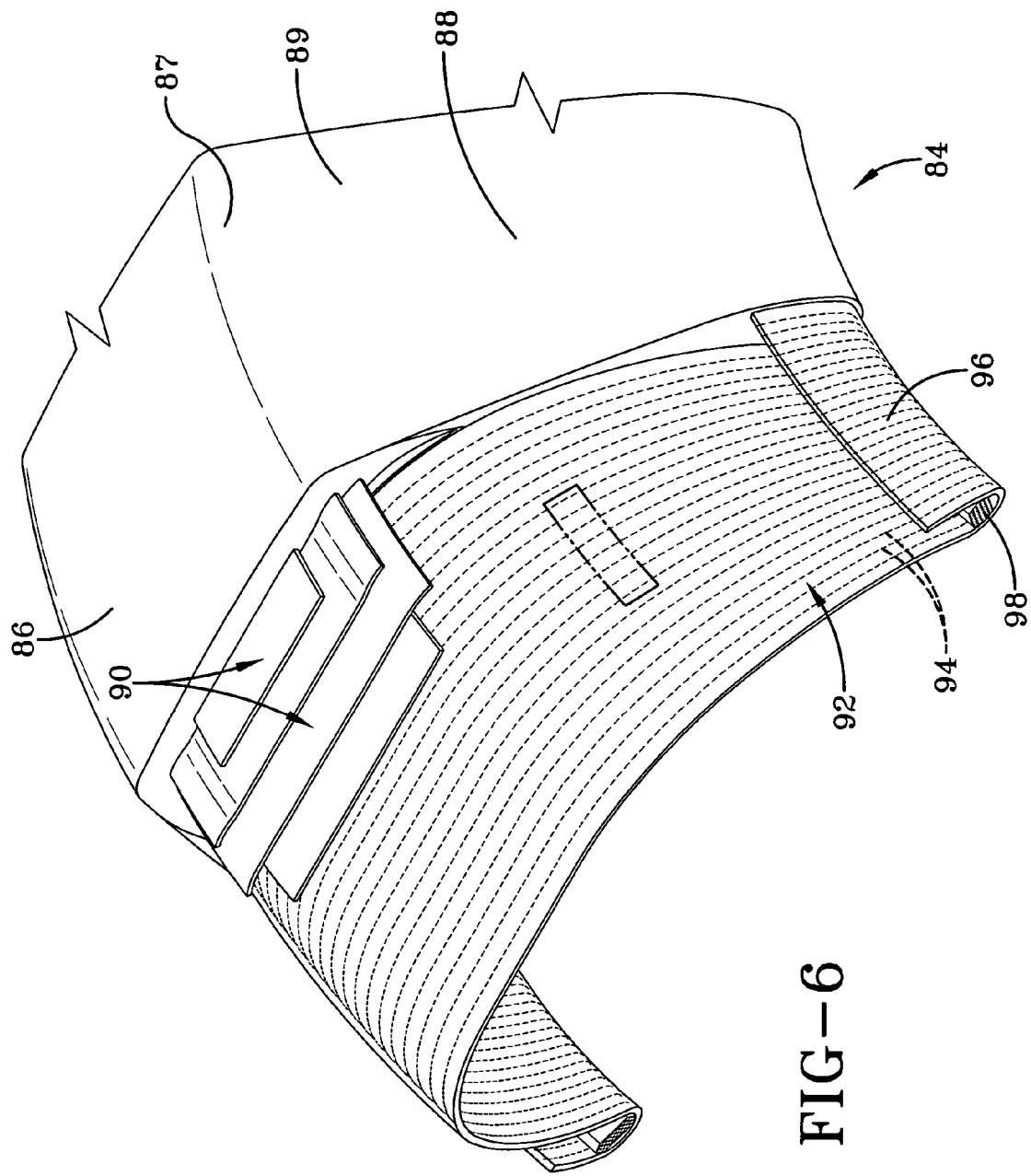
FIG. 6 is a perspective view of a portion of a representative green tire with portions removed for the purpose of explanation.

Referring to FIG. 6, the construction of a typical toroidal green tire is represented for purposes of illustration. Pursuant to standard manufacturing techniques in the tire industry, a tire is initially constructed in a flat build stage as layers applied to a tire building drum. Subsequent to the flat build stage, the tire carcass is inflated into an annular form known in the industry as a "green" tire. Subsequently, additional layers are applied and final curing of the tire is effected. The radial tire 84 shown in FIG. 6 is in the green toroidal stage, and includes a crown 86 having axially outward crown sides 87; sidewalls 88 including upper sidewall portions 89 that intersect the crown sides 87; a belt package 90 underlying the crown, and a steel cord tire ply 92. The tire ply 92 is constructed from rubber coated steel wires 94 in mutually spaced apart relationship, and ply 92 includes turn up portions 96 that wrap around beads 98 so that the ply layer 92 extends bead to bead across the toroidal shape of the green tire 84. During expansion of the tire carcass between the flat build stage and the toroidal form, anomalies may be created in the spacing, location, and condition of the wires 94 that can degrade the performance of the tire. It is, therefore, important to ensure that the spacing, location, and condition of the wires 94 remain within intended specification tolerances after the tire carcass is expanded into the green toroidal configuration shown.

With reference to FIGS. 7, 9, 12, and 13, the sensor system and associated apparatus include a clevis 100 having spaced apart arms 110, 112, the sensor base block 18 pivotally attaching to an outer face of arm 112 by means of pin 102 extending through block passages 40, 41 and arm 112. Rotation of the sensor system 10 about the clevis 100 by means of pin 102 allows the angle between the clevis 100 and sensor system 10 to be altered to adjust to the particular tire size and diameter to be scanned as explained below. Once set for a particular tire, rotation between the sensor system 10 is inhibited and the system 10 is held at a fixed angle.

An elongate mounting bracket 104 comprising a generally rectangular plate 106 is provided. The clevis 100 is affixed to plate 106, and a U-shaped slide bracket 108 projects outward from the plate 106. Bracket 108 carries a pair of setscrews 109. Pivotally attached to remote ends of the clevis arms 110, 112 is a stitcher wheel 114. Wheel 114 is generally disk shaped having a circular peripheral surface 118. The wheel 114 mounts to a central rim 120. A tubular arm 116 extends from the stitcher wheel 114 to a location between remote ends of the clevis 100 and is pivotally attached to the clevis by means of pin 117. A lever arm 122 has a remote end affixed to the pin 116 and an opposite end connected to an adjustment screw 124. Screw 124 is mounted between arms 110, 112 of the clevis 100 by means of a transverse pin 126 as best viewed from FIG. 111.

The clevis 100, mounting bracket 104, and plate 106 sliceable attach to a generally transverse slide rail 130 by means of the bracket 108 and reciprocally moves into alternative locations along the rail 130. The assembly 100, 104, 106 carry the sensor system 10 and stitcher wheel 114 along the rail 130 to suit the particular tire size/diameter to be scanned. Once adjusted, setscrews 109 operatively hold the assembly at the desired location along the rail 130.

Figure 10:
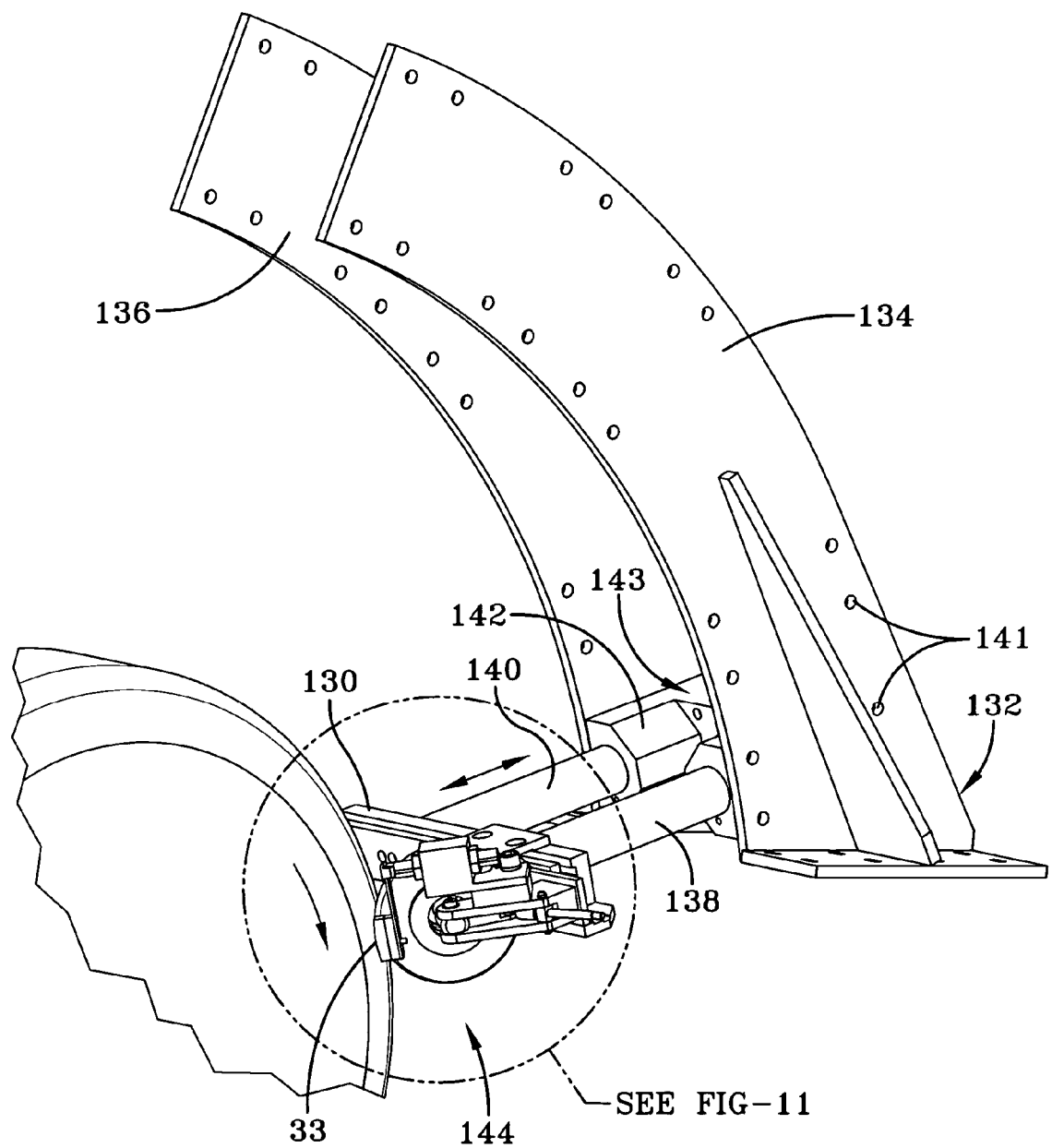
FIG. 10 is a partial perspective view of a green tire carcass having a ply wire sensor system operatively positioned against the carcass and supporting bracket apparatus.
Figure 11:
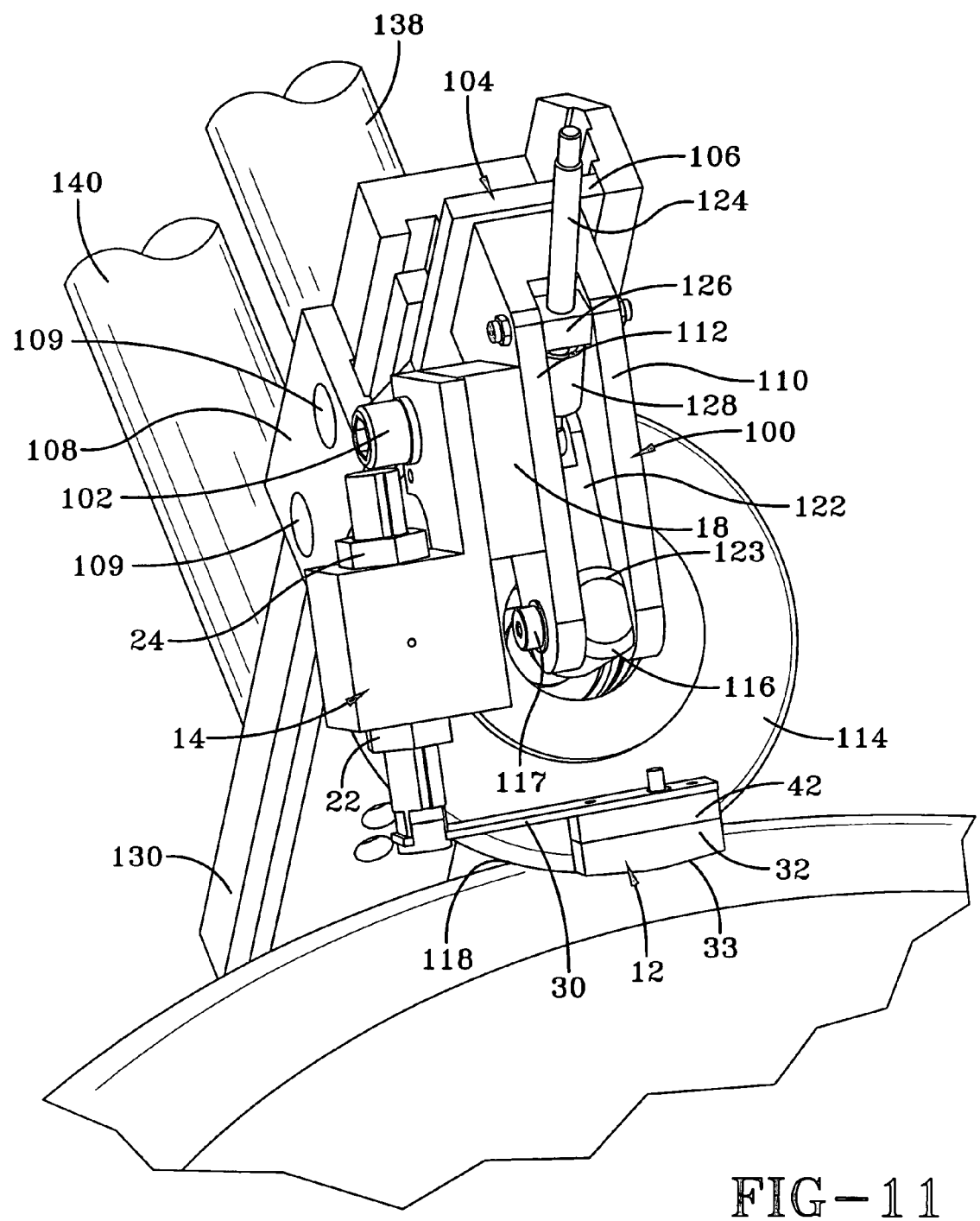
FIG. 11 is an enlarged partial perspective view of a ply wire sensor system operatively positioned against a green tire carcass.
Figure 12:
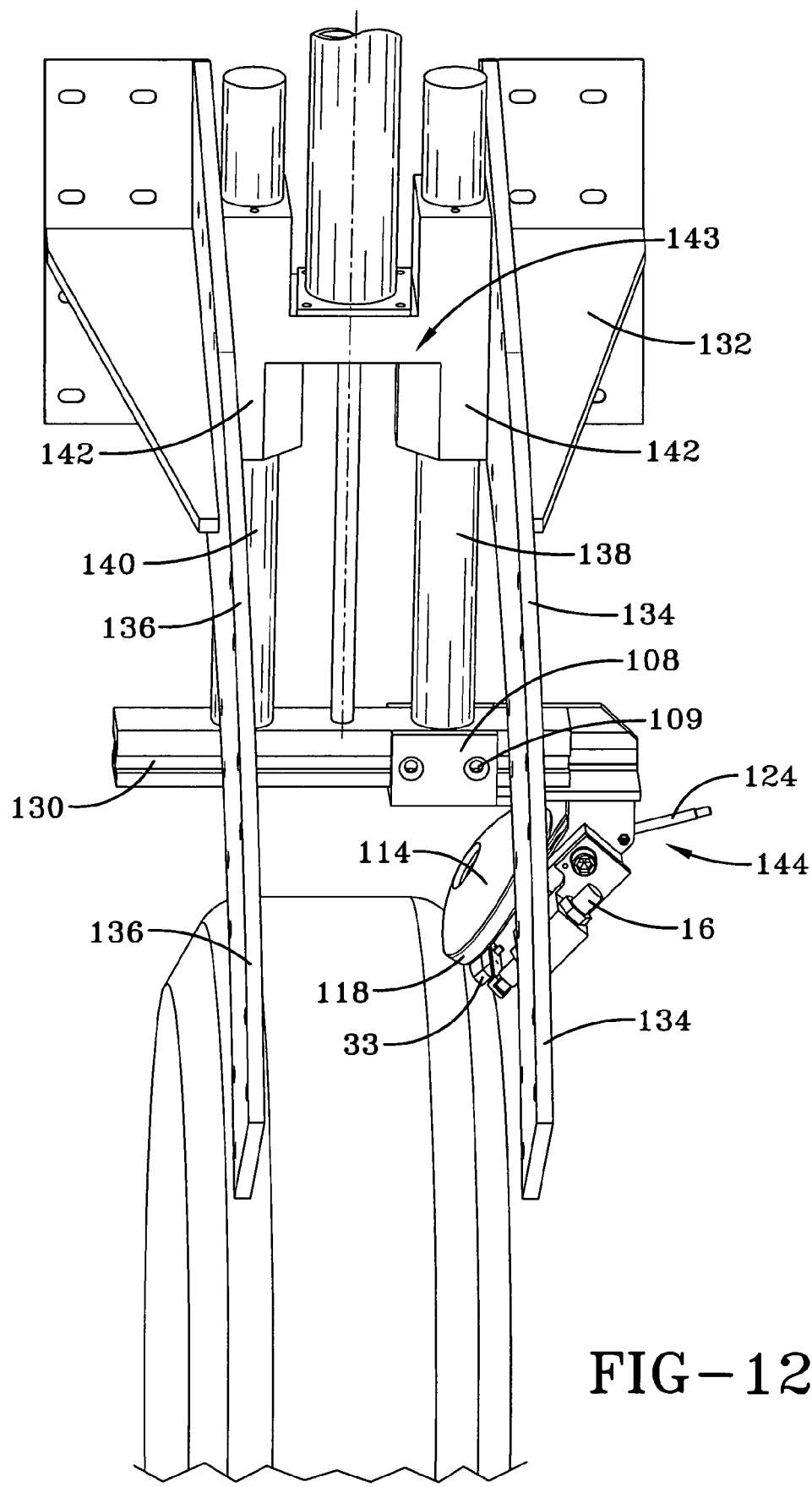
FIG. 12 is a top perspective view of a ply wire sensor system, tire carcass, and support bracket.

A generally C-shaped support bracket 132 is provided having parallel bracket arms 134, 136, formed from suitably sturdy such as steel as best seen in FIGS. 10 and 12. The bracket is fixed in a stationary location adjacent a tire build station as shown in FIGS. 10 and 12. The bracket 132 has a series of mounting apertures 141 spaced along arm 134, 136, each representing an alternative location for the sensor/stitcher wheel assembly.

A pair of tubular posts 138, 140 has remote ends 141 that attach to the rail 130 and serve to move the rail 130 and the stitcher wheel/sensor assembly affixed thereto toward and away from the tire building drum. Opposite ends of the posts 138, 140 are thus connect to conventional means for achieving such movement, such as a hydraulic or pneumatic cylinder (not shown). An H-shaped support bracket 143 having post-receiving through bores 140, 142 is mounted between the arms 134, 136 of the bracket 132. The location of the support bracket 143 along the arms 134, 136 is determined by the tire size and radius that is to be scanned. The posts 138, 140 extend through the bores 140, 142, respectively, of the H-shaped bracket 142 and reciprocally slide therein to move the guide rail 130 toward and away from the green tire 84. Alternative configurations of hardware may be employed to move the sensor assembly 10 and stitcher wheel 114, either jointly or independently, into an operative position relative to the tire 84 without departing from the spirit of the invention. The clevis 100 and associated sensor assembly 10 and stitcher wheel 114 are thus reciprocally repositionable along the rail 130 in an axial direction relative to the tire 84 and held at a tire-determinate location along the rail 130. Moreover, the rail 130 and clevis 100, assembly 10, and wheel 114 move reciprocally in a radial direction toward and away from the tire 84.

Figure 7:
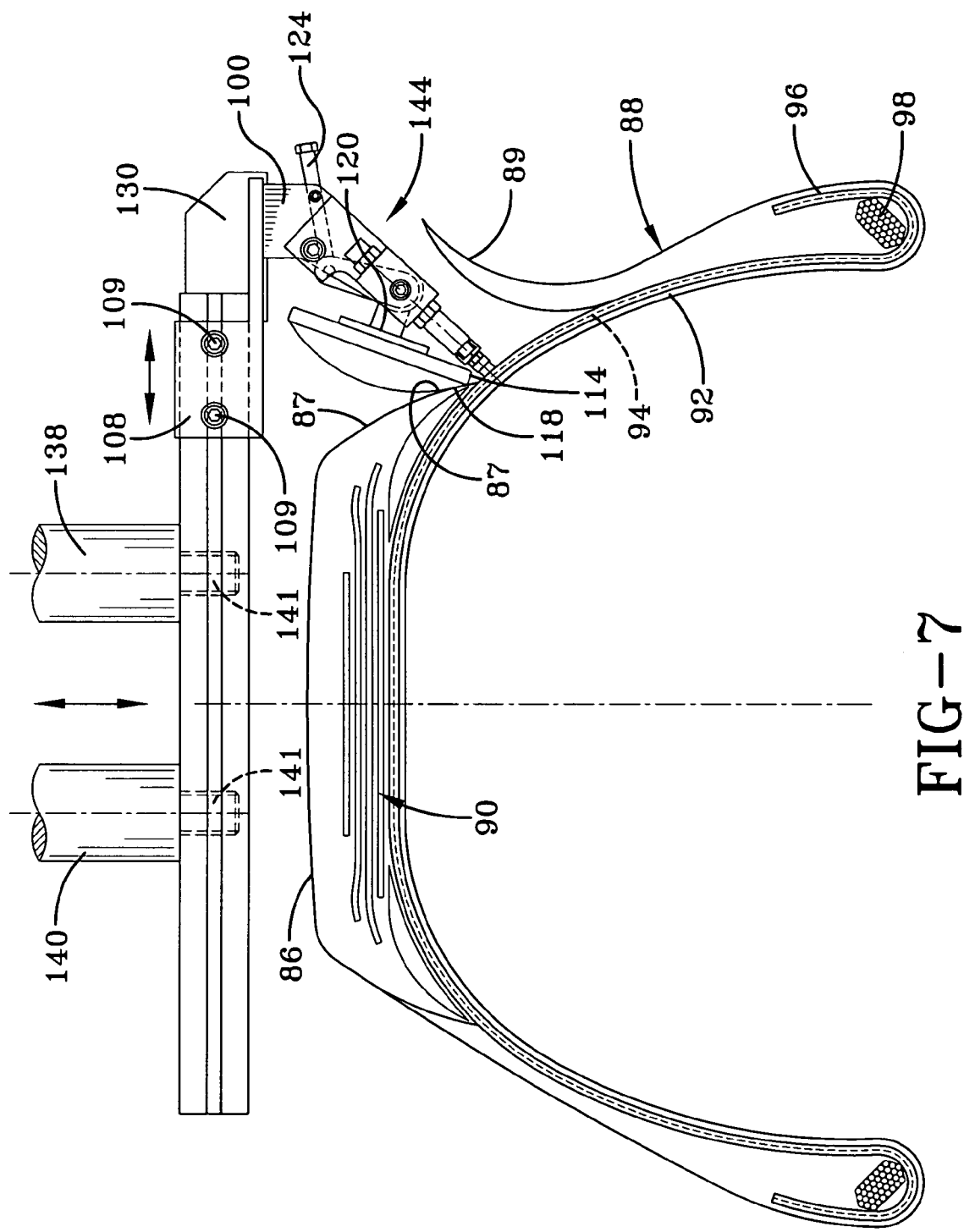
FIG. 7 is a transverse section view through a green tire carcass having a ply wire sensor system operatively positioned in relation thereto.
Figure 9:
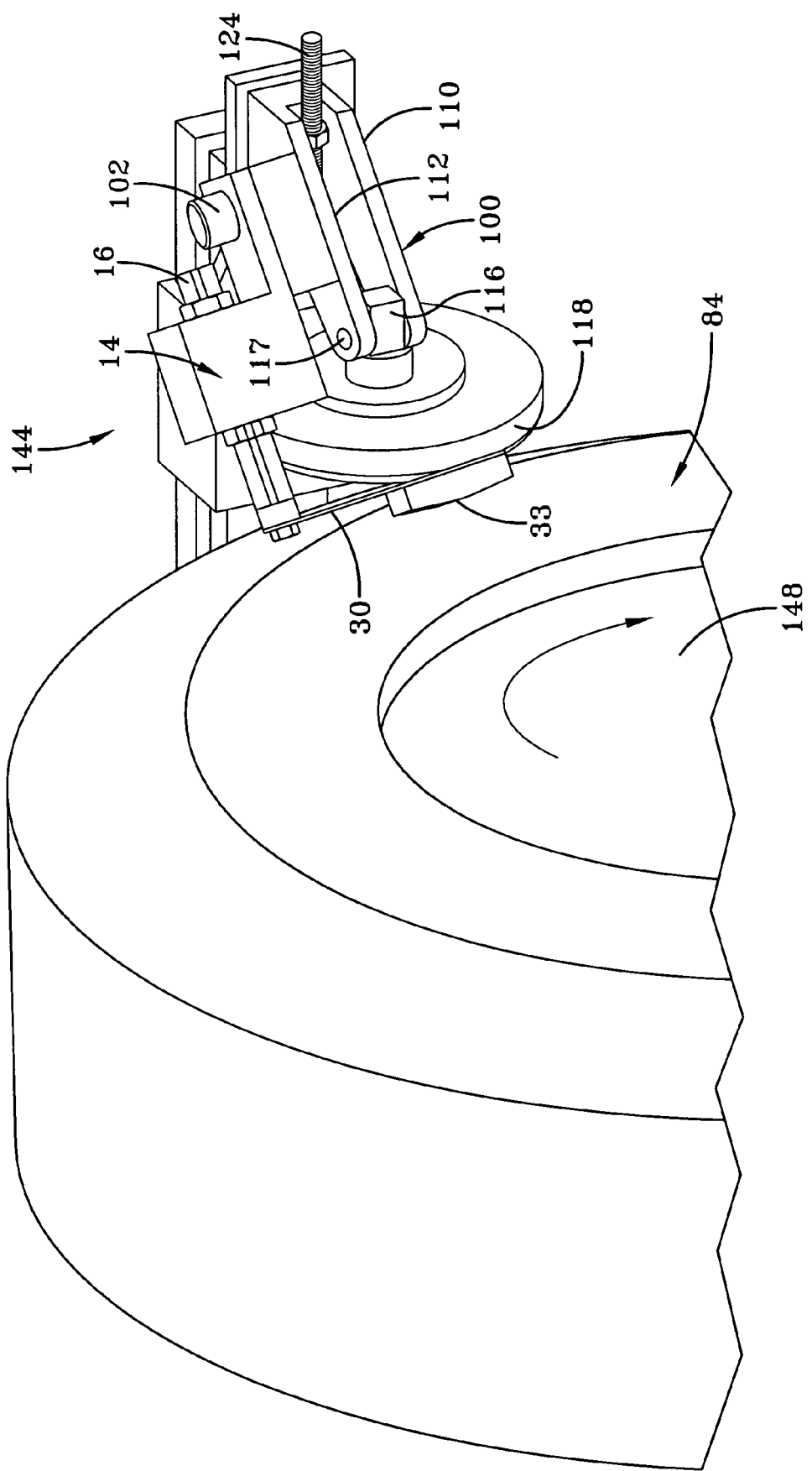
FIG. 9 is a side perspective view of the ply wire sensor system of FIG. 7 showing the sensor assembly operatively positioned against a green tire.

With reference to FIGS. 7, 9, and 12, numeral 144 is used in an overall sense to refer to the sensor/stitcher assembly previously described. The assembly 144 as explained above moves along the rail 130 into one of several alternative locations, as determined by the size of the tire to be evaluated. Assembly 144 is affixed at the selected location by locking down the bracket 108 with setscrews. While a single assembly 144, comprising the stitcher wheel and sensor assembly may be configured as described above as moving in unison, alternative embodiments may be deployed in which the stitcher wheel (or other apparatus performing a similar function) and the sensor assembly move independently.

Figure 8:
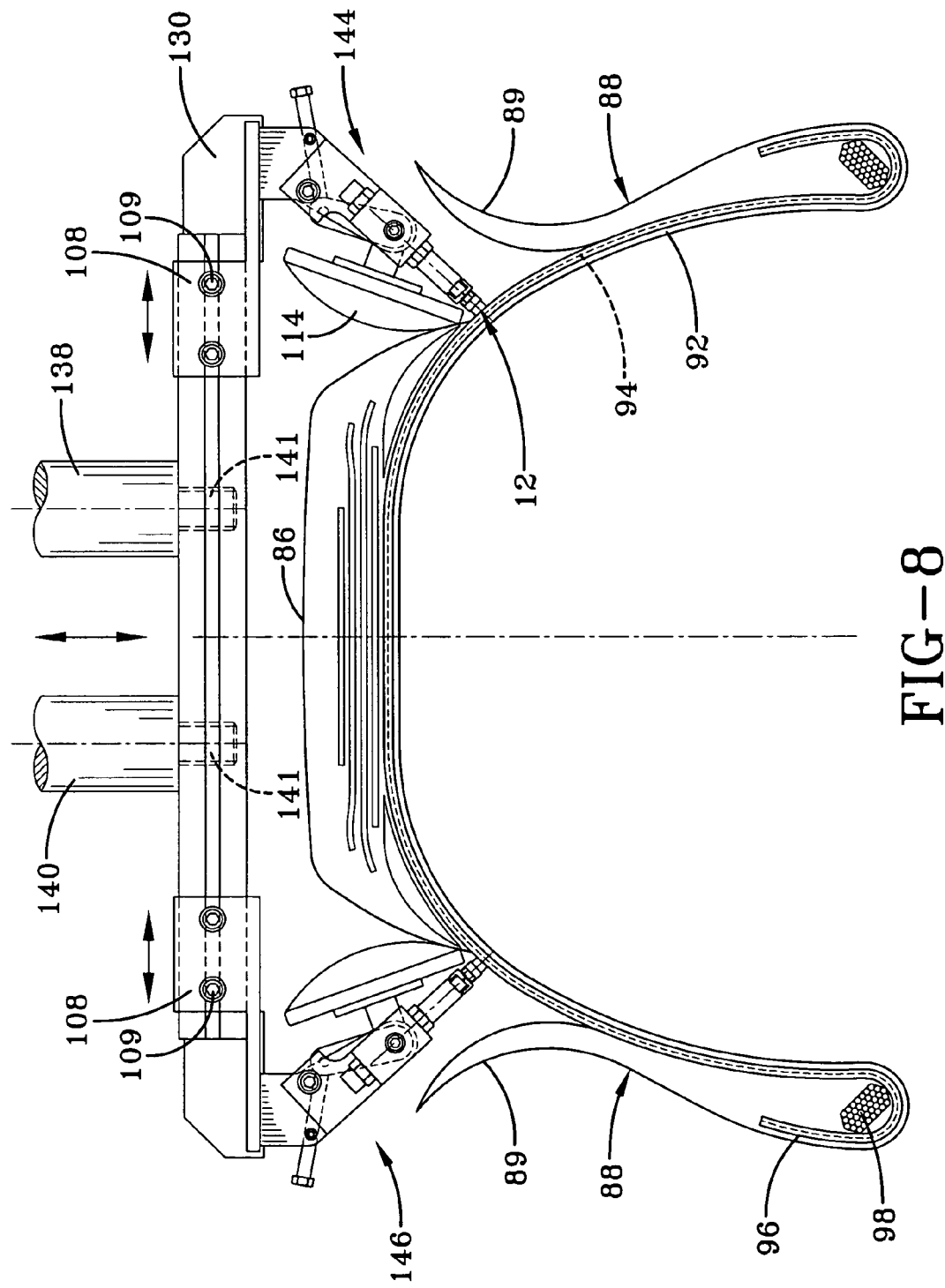
FIG. 8 is an alternative embodiment showing a transverse section view through a tire carcass having dual ply wire sensor systems operatively positioned in relation thereto.

Alternatively, a second sensor/stitcher assembly 146 may be deployed on the opposite side of the green tire to 84 to scan the ply wires at the opposite side as shown in FIG. 8. Assembly 146 is configured as explained above with regard to assembly 144. The advantage afforded by embodiment shown in FIG. 8 is that a dual system allows a (preferably but not necessarily) simultaneous evaluation of the ply wire (location, spacing, etc.) on both sides of the green tire so as to detect anomalies that appear on one or the other, but not both, sides.

Operation of the subject sensor apparatus will be appreciated from consideration of FIGS. 2, 7, 10, 11, and 12. FIG. 7 illustrates the position of the stitcher wheel 114 and sensor assembly 12 at the initiation of the scanning sequence. The green tire 84 is constructed initially over a shaping drum and subsequently diametrically expanded into the toroidal shaped green tire shown. The tire 84 is mounted on a rotating drum As explained, such an expansion may alter the spacing, location, and other parameters of the ply wires 94 constructing ply 92, particularly over the shoulder and tread regions of the tire where expansion is greatest. The sensor 12 is oriented to come into the green tire 84 at an angle of approximately 5 degrees, facilitated by the acute angled orientation of clevis bracket 100. Approaching at such an angle ensures a smooth engagement between the sensor wear shoe 32 and the green tire external surface and avoids slippage at the start of the scanning procedure.

Subsequent to diametric expansion of the tire carcass into the toroidal form shown in FIG. 7, the end portions 89 of the tire sidewall 88 are disconnected from the side portion 87 of the crown 86 to expose the carcass ply 92. Thereafter, the sensor assembly 10 is carried by the rail 130 into an engagement against the carcass ply 92 proximate the intersection of portions 87, 89. The sensor 52 is thus housed within shoe 32 which is made of a low friction and wear resistant material. The sensor is protected by the shoe. The surface 33 of sensor wear shoe 32 is biased against the ply 92 by operation of the cantilever spring 30, composed preferably but not necessarily of one or more pieces of high spring force steel. The spring 30 allows the tire to push against the shoe, with the sensor maintaining close proximity to the ply surface. The spring steel 30 is bolted to the adjustment screw 16 which is threaded into housing 14 for adjustment purposes. As the stitcher wheel 114 moves forward, the shoe 32 will be positioned such that there is slight interference with the ply surface. As the shoe surface 33 contacts the ply, the spring finger will flex, leaving the shoe on the ply. The adjustment screw is used to provide more or less initial interference and the housing 14 can be rotated to adjust the orientation of the shoe to the ply. The degree of pressure of surface 33 against the ply may be adjusted by the screw 16 extending to a greater or lesser extent through housing 14. Thus, the sensor 12 is resiliently held at an appropriate pressure against the ply and maintained at a preferred scanning relationship and distance to the carcass ply 92 and the wires 94 thereof.

Likewise, the stitcher wheel 114 is carried by the rail 130 toward the tire carcass 84 and is brought into an engagement with the portions 87 (also referred herein as the "miniskirt") of the crown 86. The stitcher wheel 114 is pressured against the miniskirt 87 and shoulder wedge regions of tire 84, forming a depression. The angle of wheel 114 and the magnitude of the pressure of the wheel 114 against the portions 87 are adjusted by the screw 124. Adjustment of screw 124 pivots lever arm 122 which in turn pivots pin 116 and the stitcher wheel 114 affixed thereto. The depression depth caused by the wheel 114 may thus be adjusted.

The depression caused by the stitcher wheel 114 is generally in the shape of a wave. The offset between the stitcher wheel and the sensor assembly wear shoe 32 is such that the wear shoe 32 will be positioned on top of the wave depression as the shoe surface 33 rubs on the ply 92. The depth of the depression is then increased another one-eighth inch or three mm. Positive contact between the shoe 32 and the ply is thus insured. The stitcher wheel 114 thus acts to prepare the surface of the ply so as to enable a positive contact between the ply and the shoe 32. The shoe 32 is either formed from or coated with a suitable low friction material such as TEFLON to enable the shoe to smoothly travel across the outer green tire surface with minimal friction. Excess friction is not desirable and can rub the coating off of the ply wires.

Thereafter, the green tire carcass is rotated on the shaping drum 148 as in the direction shown in FIGS. 9 and 10. As the carcass rotates, the series of transverse ply wires 94 are sequentially brought into a scanning relationship to the sensor 52 within the spacer shoe 42. The sensor 52 operating under Hall-effect principles described above (or other suitable wire detection technique or principle) identifies each wire's location, spacing relative to adjacent wires and the carcass itself, and the condition of each wire's coating. Each ply wire 94 is located and its relationship to the green tire carcass and adjacent ply wires are ascertained in order to identify any anomalies that may have arisen due to the diametric expansion of the tire carcass from the flat build cylindrical form into the toroidal green tire configuration. Data indicative of the location, spacing, and condition of each ply wire is thus generated and transmitted to a processor for analysis. In addition, the subject method is capable of analyzing the integrity of ply splice joints by detection of the ply wire spacing, location, and/or condition across any such joints in the carcass ply. In assessing and evaluating the splice joints, the subject invention is able to identify weak or improperly configured joints that could lead to tire degradation or failure as the tire is used. The sensor assembly 12 follows along an annular path as the green tire carcass is rotated by the shaping drum 148. One or more revolutions may be employed to scan each ply wire 94.

By way of example, with no intent to limit the invention to the system parameters discussed, many tires have 1200 to 1300 wires in the ply block. If the drum 148 rotates at 30 rpm or a revolution every 2 seconds, 600 wires/sec (1200 wires/2 sec.) will pass in front of the sensor 52. A sensor plot will consist of a wave of varying amplitude, with the amplitude spikes representing the presence of a wire. The stream of data may be analyzed and displayed to an operator by suitable display. For example, a computer screen may display a green light for appropriate/within acceptable range wire spacing and a red light for out of acceptable range spacing. The system processor may verify wire count, spacing, amplitude of output signal.

Upon completion of the ply scan, the portions 89 of the sidewall are brought back into an original position covering the carcass ply 92 and abutting the miniskirt 87 of the crown 86. Any anomalies in the location, spacing, and condition of the ply wires 94 may be evaluated and a decision based upon the condition of the ply wires can be made. Adjustments to the assembly process or carcass components may made in "real time" as necessary to eliminate or lessen the observed and measured anomalies to ensure that the ply wires in future green tires are in an optimal, anomaly-free, configuration and orientation.

The speed at which the build drum 148 rotates may be controlled for optimal scanning efficiency. As set forth in the system block diagram of FIG. 5, dual sensors 64, 66 may be utilized to scan the ply wires on both sides of a green tire. The sensors transmit data regarding the ply wires to a sensor PC 72 that interfaces to machine control and may include start/stop, data "ok", data acquired signals. The tire machine 80 is thus controllable from data acquired as a result of the scanning procedure described above. A user interface 76, 78 may allow an operator to monitor the condition of the ply wires by means of appropriate display.

From the embodiment described in detail above, one important aspect of the invention is that the sensor may scan the carcass before the belt and tread package is transferred onto the toroidially expanding carcass. This position or phase of construction allows scanning clear and free of folded back tire parts. The scan consumes a minimal amount of time, perhaps adding on the order of six seconds to the cycle time for tire construction. The scanning process is well worth the invested time since it allows selection of all size and shape of tires whereas other types of scanning systems may be inhibited due to tire size and geometry variations. Also, an added benefit is that the tread and belt packages are very expensive. Detecting anomalies by means of the subject invention at this position or phase of construction avoids scrapping the tread and belt packages later should the carcass be dysfunctional due to ply wire spacing anomalies.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A ply wire sensor system for a tire carcass ply having a toroidal shape and a plurality of spaced apart ply wires extending across the toroidal shape, the sensor system comprising:
   a. a wire sensor apparatus mounted in contacting engagement with the tire carcass ply, the wire sensor apparatus including a wire sensor for detecting the presence of a proximal ply wire;
   b. means for establishing relative movement between the wire sensor and the tire whereby the plurality of spaced apart ply wires are sequentially placed into proximity with the wire sensor, and the wire sensor generating sequential data indicative of at least one ply wire parameter of the plurality of spaced apart ply wires.

2. A ply wire sensor system according to claim 1, wherein the wire sensor is mounted within a sensor housing disposed in contacting engagement with the tire carcass ply.

3. A ply wire sensor system according to claim 1, wherein the at least one ply wire parameter is taken from the group: [ply wire location; ply wire spacing; ply wire number; ply wire presence; ply wire condition].

4. A ply wire sensor system according to claim 3, wherein the ply wire sensor generates data indicative of a plurality of ply wire parameters taken from the group.

5. A ply wire sensor system according to claim 1, wherein the wire sensor sequentially senses the plurality of ply wires subsequent to diametric expansion of the tire carcass ply from an initial flat build diameter into a toroidally expanded diameter.

6. A ply wire sensor system according to claim 1, wherein the wire sensor comprising a Hall effect-based sensor.

7. A ply wire sensor system according to claim 1, wherein the sensor system further comprising a sensor housing receiving the wire sensor therein and maintaining the wire sensor at a predetermined relationship to the carcass ply.

8. A ply wire sensor system according to claim 7, wherein further comprising biasing means for biasing the sensor housing against the carcass ply.

9. A ply wire sensor system according to claim 8, wherein the biasing means comprising a cantilevered leaf spring.

10. A ply wire sensor system for a tire carcass ply having a toroidal shape and a plurality of spaced apart ply wires extending across the toroidal shape, the sensor system comprising:
    a. a wire sensor apparatus mounted in proximity with the tire carcass ply, the wire sensor apparatus including a wire sensor for detecting the presence of a proximal ply wire;
    b. means for establishing relative movement between the wire sensor and the tire whereby the plurality of spaced apart ply wires are sequentially placed into proximity with the wire sensor, and the wire sensor generating sequential data indicative of at least one ply wire parameter of the plurality of spaced apart ply wires;
    wherein the sensor system further comprising a sensor housing receiving the wire sensor therein and maintaining the wire sensor at a predetermined relationship to the carcass ply and
    wherein the sensor system further comprising means for temporarily removing a carcass covering layer portion from a carcass ply portion whereby exposing the carcass ply portion to the sensor housing; and depressing means mounted adjacent to the sensor housing for sequentially depressing an external toroidal surface portion of the tire carcass adjacent the carcass covering layer portion.

11. A ply wire sensor system according to claim 10, wherein further comprising adjustment means for controlling the extent of depression caused by the depressing means.

12. A green tire and ply wire evaluation system comprising:
    a. a toroidal green tire carcass body having an expanded toroidal diameter, the carcass body having a tire carcass ply of toroidal shape and a plurality of spaced apart ply wires extending across the toroidal shape;
    b. a wire sensor mounted in an assembly in contacting engagement with the tire carcass ply, the wire sensor detecting the presence of a proximal ply wire;
    c. means for establishing relative movement between the wire sensor and the tire whereby the plurality of spaced apart ply wires are sequentially placed into proximity with the wire sensor, and the wire sensor generating sequential data indicative of at least one ply wire parameter of the plurality of spaced apart ply wires.

13. A green tire and ply wire evaluation system according to claim 12, wherein the wire sensor is mounted within a sensor housing disposed in contacting engagement with the tire carcass ply.

14. A green tire and ply wire evaluation system according to claim 12, wherein the at least one ply wire parameter is taken from the group: [ply wire location; ply wire spacing; ply wire number; ply wire presence; ply wire condition].

15. A green tire and ply wire evaluation system according to claim 14, wherein the ply wire sensor generates data indicative of a plurality of ply wire parameters taken from the group.

16. A green tire and ply wire evaluation system according to claim 12, wherein the wire sensor is taken from the group of sensors comprising: a Hall effect-based sensor; a magnetic resistance type sensor.

17. A green tire and ply wire evaluation system according to claim 12, wherein the sensor system further comprising a sensor housing receiving the wire sensor therein and maintaining the wire sensor at a predetermined relationship to the tire carcass ply.

18. A green tire ply wire evaluation system comprising:
a. a toroidal green tire carcass body having an expanded toroidal diameter, the carcass body having a tire carcass ply of toroidal shape and a plurality of spaced apart ply wires extending across the toroidal shape;
b. a wire sensor mounted closely adjacent to the tire carcass ply, the wire sensor detecting the presence of a proximal ply wire;
c. means for establishing relative movement between the wire sensor and the tire whereby the plurality of spaced apart ply wires are sequentially placed into proximity with the wire sensor, and the wire sensor generating sequential data indicative of at least one ply wire parameter of the plurality of spaced apart ply wires; wherein the sensor system further comprising a sensor housing receiving the wire sensor therein and maintaining the wire sensor at a predetermined relationship to the tire carcass ply; and wherein the sensor system further comprising means for temporarily removing a carcass covering layer portion from a carcass ply portion whereby exposing the carcass ply portion to the sensor housing; and depressing means mounted adjacent to the sensor housing for sequentially depressing an external toroidal surface portion of the tire carcass adjacent the carcass covering layer portion.

19. A green tire and ply wire sensor system according to claim 18, wherein further comprising adjustment means for controlling the extent of depression caused by the depressing means.

20. A green tire and ply wire sensor system according to claim 17, wherein further comprising biasing means for biasing the sensor housing against the carcass ply.

* * * * *